United States Patent [19]

Walsh

[11] Patent Number: 5,594,035
[45] Date of Patent: Jan. 14, 1997

[54] RECLAMATION OF POLYMERS, THAT CONTAIN STYRENE IN THE POLYMERIC BACKBONE, USING A WATER SOLUBLE SOLVENT BASED RECLAMATION PROCESS

[75] Inventor: William C. Walsh, Archbold, Ohio

[73] Assignee: BASF Corporation, Mount Olive, N.J.

[21] Appl. No.: 558,058

[22] Filed: Nov. 13, 1995

[51] Int. Cl.$^6$ .................................................. C08J 11/04
[52] U.S. Cl. ........................... 521/47; 521/42; 521/42.5; 521/147; 528/422; 528/492
[58] Field of Search ............................. 521/47, 42, 42.5, 521/147; 528/492, 422

[56] References Cited

U.S. PATENT DOCUMENTS

| | | | |
|---|---|---|---|
| 3,736,271 | 5/1973 | Schutze | 521/47 |
| 4,031,039 | 6/1977 | Mizumoto | 521/46.5 |
| 4,196,105 | 4/1980 | Kubiat | 521/46.5 |
| 4,517,312 | 5/1985 | Kumanska | 521/47 |
| 5,232,954 | 8/1993 | Peters | 521/47 |
| 5,269,948 | 12/1993 | Krutchen | 521/47 |

Primary Examiner—Paul R. Michl
Assistant Examiner—Olga Asinovsky
Attorney, Agent, or Firm—Joanne P. Will

[57] ABSTRACT

A process for the reclamation of polystyrene and other styrene containing polymers, by dissolving said polystyrene polymer into a water soluble solvent, such as NMP, and then precipitating said polymer away from the water soluble solvent through the addition of the water soluble solvent/styrene polymer solution into water. The particles of the polymer that precipitate out and float to the surface of the water can be collected and dried at temperatures that do not give added heat history to the polymer.

10 Claims, No Drawings

RECLAMATION OF POLYMERS, THAT CONTAIN STYRENE IN THE POLYMERIC BACKBONE, USING A WATER SOLUBLE SOLVENT BASED RECLAMATION PROCESS

FIELD OF THE INVENTION

The present invention relates to a process for reclaiming polystyrene by dissolving said polystyrene into N-methylpyrrolidone.

BACKGROUND OF THE INVENTION

Polymers that have styrene as a raw material, which is reacted into a repeating styrene polymeric backbone, are used throughout the world at the rate of hundreds of millions of tons per year. The largest percentage of the volume is produced and consumed in the basic polymeric form of polystyrene. Expanded (or foamed) polystyrene is used as insulation material in applications ranging from the regulation of temperature in our homes, to the insulation of hot food products. Solid polystyrene is used in food packaging and storage containers.

Over the years, the use of "alloys" or polymers that have styrene and other monomers reacted together, to give a polymer with characteristics and physical properties different from polymers that would have resulted if each monomer was reacted separately, has become common place also. The weatherable copolymers, acrylonitrile-butadiene-styrene (ABS) and styrene-acrylate-acrylonitrile (SAA) are examples of some of these polymers "alloys".

Since polystyrene, and also the polymer "alloys" containing styrene, are highly resistant to being degraded by oxygen and sunlight, and are not broken down by bacteria, the long-term storage of items made out of these polymers creates large problems for landfills.

The art has attempted to deal with this problem through various methods of recycling the polymers. Kumasaka (U.S. Pat. No. 4,517,312) describes a process that utilizes the solvating of polystyrene into a water insoluble solvent, such as methylene chloride or carbon tetrachloride and then precipitating the polymer by the addition to water. The solvents chosen are all air toxics, and not readily biodegradable. The potential for solving one pollution problem (reduction of polystyrene waste), by creating air and water pollution problems does exist.

Schutze (U.S. Pat. No. 3,736,271) describes a process that involves the heating up of polymers to very hot temperatures (to melting points), and then adding an initiator to re-polymerize the polymers. While this technique may work for polystyrene, the energy requirements are large, and the large amount of fossil fuel related $CO_2$ generated has to be considered.

Krutchen (U.S. Pat. No. 5,269,948) describes a method of recycling polystyrene by dissolving the polymer into styrene, and then using this styrene/polystyrene solution as a portion of feed stock that is added to a reactor making new polystyrene. Again, the process involves the dilution of a polymer into a water insoluble solvent. Also, the most economical means for using a reclamation process that involves the dissolution of a polymer into a solvent entails having that activity carried out at a "local" point, followed by transporting the solvent/polymer to a central processing location, the potential for spilling the solvent at the "local" point exists.

Kubat (U.S. Pat. No. 4,196,105) describes a polystyrene recovering process comprising contacting the polystyrene with liquid sulfur dioxide. Mizumoto (U.S. Pat. No. 4,03 1,039) discloses a method for treating polystyrenic polymers comprising contacting said polystyrenic polymers with an organic solvent such as benzene, toluene or xylene.

Clearly, there is a need for the development of a reclamation process that can be initiated locally, using a solvent that is safe for the environment, as well as being safe for those workers involved in carrying out the reclamation process, that would be an advancement over the current styrene based polymer reclamation technology. Applicant has surprisingly discovered a styrene reclamation process that can be initiated locally, and employs an environmentally safe solvent.

SUMMARY OF THE INVENTION

The present invention allows for the reclamation of polymers that have styrene as one of the original monomers utilized in the chemical construction of the polymer, or alloys and blends of polymers that have polystyrene as a component. The reclamation process involves the dissolving of the styrene polymer scrap material into a totally water soluble solvent, such as N-methyl pyrrolidone (NMP), to form a water soluble solvent/styrene polymer solution. This water soluble solvent/styrene polymer solution is then added to water. Upon contact with the water, the styrene polymer precipitates out of the newly created water soluble solvent/styrene polymer/water mixture, and floats to the surface. After soaking in the water, the re-generated styrene polymer is then dried to remove residual amounts of water and water soluble solvent that are trapped in the polymer.

The highest temperature encountered in the process is a water temperature of 100° C., which can occur in the precipitation operation. The process insures that the styrene polymer is recycled without adding extra heat history to the polymer. This results in the styrene polymer maintaining most of its original physical property values for those properties that are affected by extra added heat stress.

DETAILED DESCRIPTION OF THE INVENTION

The present invention allows for the reclamation of polymers that have styrene as one of the original monomers utilized in the chemical construction of the polymer, or alloys and blends of polymers that have polystyrene as a component. The reclamation process involves the dissolving of the styrene polymer scrap material into the totally water soluble solvent, such as N-methyl pyrrolidone (NMP), to form a water soluble solvent/styrene polymer solution. The water soluble solvent/styrene polymer solution is then added to water. Upon contact with the water, the styrene polymer precipitates out of the newly created water soluble solvent/styrene polymer/water mixture, and floats to the surface. After soaking in the water, the re-generated styrene polymer is then dried to remove residual amounts of water and NMP that are trapped in the polymer.

The highest temperature encountered in the process is a water temperature of about 100° C., which can occur in the precipitation operation. The process insures that the styrene polymer is recycled without adding extra heat history to the polymer. This results in the styrene polymer maintaining most of its original physical property values for those properties that are affected by extra added heat stress.

The reclamation of the styrene polymer using the method according to the present invention, is carried out as described hereinbelow.

A. Dissolving of the Scrap Polystyrene Polymer into the Water Soluble Solvent.

An item manufactured out of the styrene polymer is used for its intended purpose, and for its established life time. Items manufactured out of styrene polymers can be as uncomplicated as foamed polystyrene packing beads or "peanuts", or as complicated as an intricately designed part that has utility under the hood of an engine for an automobile, or a large injected molded part such as swimming pool step assemblies, that will have to have a long life in the outside weather.

Once the product use life cycle is finished, user of the said product takes the item to a "local" collection point, where the recycling process can begin. At the local collection point will be a vessel that is filled with a water soluble solvent, such as, but not limited to NMP. Other acceptable water soluble alkylated pyrrolidones include, but are not limited to, N-ethyl pyrrolidone; hydroxyethyl pyrrolidone; 1-(2-hydroxyethyl) pyrrolidone iso propyl pyrrolidone; 1-(n-butyl) pyrrolidone; 1-(3-hydroxy propyl) pyrrolidone; 1-(2)-methoxy ethyl) pyrrolidone; 1-(3-methoxy propyl pyrrolidone). NMP is preferred because NMP has a low degree of toxicity, and is highly biodegradable, thus lowering the potential risks for the environment and the workers at the "local" point of recycle.

NMP is available in a number of different grades on the open market. Some of the grades of NMP available are recycled NMP, technical grade NMP (which is a blend of NMP and gamma butyrolactone), high purity electronic grade NMP, and the normal industrial/commercial grade of NMP. All these grades of NMP are suitable for use as the water soluble solvent in the present invention. The various grades of NMP can be obtained from one or more the three manufacturers of NMP, listed here: BASF Corporation (Mount Olive, N.J.), International Specialty Products (Wayne, N.J.), and Arco Chemical Company (Newton Square, Pa.).

The other specialty pyrrolidones are available in limited quantities, from either BASF Corporation or Intentional Specialty Products.

The vessel containing said water soluble solvent can be as simple as a 55 gallon steel drum, or polypropylene tank wherein the water soluble solvent is kept at room temperature (24° C.), or the vessel can be more complicated, such as a large insulated stainless steel tank that has means to both agitate and heat up the water soluble solvent. The "simple"55 gallon drum collection vessel would have utility at a local landfill, and could be involved in the recycling of foamed polystyrene products that the home consumer would have used. The heated stainless steel tank type of vessel would have utility at a production plant, where injected molded solid parts are scrapped and rather than taking the parts to the landfill, the parts would be put into the recycling process to reclaim the styrene polymer. The temperature range of the water soluble solvent can be −20° C. to 100° C.; preferably 24° C. to 100° C.; most preferably, 24° C. to 40° C.

The used styrene polymer containing product is then placed into the vessel containing the water soluble solvent. The water soluble solvent dissolves the item and takes the styrene polymer into solution. Foamed products dissolve very quickly even at room temperature. In some instances, almost as fast as the polystyrene foam can be added to the water soluble solvent, it will be dissolved and go into solution. Items molded out of solid styrene polymers will be dissolved by the water soluble solvent at room temperature, but the rate at which they are dissolved at room temperature maybe too slow to fit into production schedules. The heating up and agitating of the water soluble solvent will allow for quicker dissolving of the solid styrene polymer by the water soluble solvent.

B. Forming the Water Soluble Solvent/Styrene Polymer Solution.

The styrene polymer resin is solvated by the water soluble solvent resulting in a newly created water soluble solvent/styrene polymer solution. If the styrene polymer had any inorganic fillers or pigments compounded into it in order to give the final molded polymer part certain aesthetics or physical properties, these fillers and pigments usually are not dissolved in the water soluble solvent, and will float to the bottom of the collection vessel where they can be easily separated or filtered out.

The water soluble solvent will dissolve from 15–20% of the styrene polymer resin at room temperature. The resin type and molecular weight are the factors that determine the amount which can be solubilized by the water soluble solvent. If the water soluble solvent is heated and agitated, greater amounts than 15–20% of the styrene polymer resin can be solubilized by the water soluble solvent. This would allow for greater degrees of concentration of the resin at the local collection point. However, once the water soluble solvent cools back down to room temperature, the amount of resin that has been added in excess of the saturation level will fall out of solution. The styrene resin that falls out of solution, will go back into solution if the water soluble solvent is heated back up to any elevated temperature. In general, heating the water soluble solvent up to a temperature in the 60–70° C. range is sufficient to dissolve most solid styrene polymer resins, however, some systems may require heating the water soluble solvent up to 80–85° C. in order to get quick dissolving action.

When foamed styrene polymers are dissolved into the water soluble solvent, for reasons of reduction of volume for transport purposes, the difference in volume between the foamed product and the dissolved resin is sometimes a decrease in volume of $10^2$ units. The volume decrease is dependent upon the density of the styrene polymer product being dissolved into the water soluble solvent.

For solid styrene polymer products, the volume change between dissolved and undissolved product is not very large at all. However, the ability to reclaim the styrene polymer resin free from any pigments or fillers is the driving force for using the current invention in the reclaiming process for these solid systems.

The concentration of the water soluble solvent/styrene polymer solution will affect the final particle size of the reclaimed resin, once the resin has been re-precipitated out of the water soluble solvent. Styrene polymer resin concentrations as low as 0.5% (by weight) lead to final particle sizes that are very small with large amounts of surface area. These particles allow for quicker removal of residual water soluble solvent out of the resin particle, and also give rise to very rapid final drying times.

Concentrations of styrene polymer resin in the 10–20% range give rise to beads of resin upon re-precipitation. These beads or pellets tend to require longer settling times to allow for removal of residual amounts of water soluble solvent trapped in the polymer and also, generally require longer final drying times. Thus, the concentration of the styrene polymer resin in the water soluble solvent will affect the rest of the reclaiming process. For reasons of economy, it would be best to concentrate the styrene polymer resin to the highest concentration possible, at the local collection point, and then dilute it down with water soluble solvent to the desired resin concentration at the final reclamation point if the final reclamation point is a distance from the collection point. When the local collection point and the reclamation point are one in the same, the concentrating of the styrene polymer resin to the desired level from the beginning makes more sense from an economic viewpoint.

Once the polystyrene resin is dissolved in the water soluble solvent, one can optionally add chemicals, such as, but not limited to, pentane, cyclopentane or hydrofluorocarbon compounds, to the water soluble solvent that are water insoluble, yet soluble in water soluble solvent, and said chemicals can be used to modify or give added life to the final recovered polystyrene polymer resin. Pentane, for example, is a liquid at room temperature and is not soluble in water. Small amounts of pentane are soluble in NMP. When expandable polystyrene is manufactured, a small amount of pentane is added to the polymerization reactor, and hence entrapped in the solid polystyrene bead.

During the molding process (to make a STYROFOAM® (foamed polystyrene) coffee cup, or packaging for electronic equipment) the polystyrene beads are heated. The heat is sufficient enough to cause the pentane to turn into a gas (expand) and eventually evaporate from the polystyrene. In the process of expanding, the pentane changes the solid polystyrene into styrofoam.

During the precipitation action, small quantities of the water insoluble chemicals, such as pentane, will remain behind in the resin, as the water soluble solvent is leeched out into the water. This can allow for the inclusion of antioxidants or flame retardants or hydrocarbons or plasticizers into the final recovered polymer.

C. Precipitating the Styrene-Containing Polymer.

The styrene polymer resin is regenerated by simply adding the water soluble solvent/styrene polymer solution to water. The styrene polymer resin then precipitates out and floats to the surface of the water. The water temperature is from 4° C. to 120° C., preferably 25° C. to 100° C.; most preferably 60° C. to 80° C.

The water should be agitated and heated if the precipitation of the styrene polymer resin does not readily occur.

The agitation of the water also prevents the resin from agglomerating and forming large "chunks" during the precipitation of the polystyrene. The styrene polymer resin particles are kept away from each other, by the agitation as the outer surface of the particles becomes free of residual water soluble solvent. Without agitation, the particles will "glue" themselves together as the local concentration of water soluble solvent in the "agglomerate" resolvates the resin particles, "gluing" them back together in a big clump.

The formation of the precipitated styrene polymer resin particles is instantaneous once the water soluble solvent/styrene polymer solution comes into contact with the water. Because it is an instantaneous action, the formation of the top layer, or skin, of the styrene polymer resin will usually trap some residual amounts of water soluble solvent inside the precipitated particle. Since the precipitated styrene polymer resin particles tend to be porous in nature, the trapped water soluble solvent can be leeched out of the styrene polymer resin particles by contact with water for extended periods of time. Room temperature water is capable of leeching the water soluble solvent out of the styrene polymer resin particles. However, depending on the size of the particles, the time frame to accomplish this leeching process could be long. For bead size particles, it could be a matter of days before all of the water soluble solvent is leeched out of the resin particles.

Further, surfactants that are soluble in water, and also soluble in water soluble solvent, can be added to the water soluble solvent/styrene polymer/water mixture to control the shape of the precipitated particle, allowing the occurrence of perfectly formed circular resin particles or beads if this is desired. Without the surfactant present in the water, the precipitated particles tend to have no defined shape, or are very flat, both of these particles shapes may allow for agglomeration of the particles as the styrene polymer resin precipitates out. More defined, consistent particle size further prevents agglomeration. Acceptable surfactants include, but are not limited to, nonionic surfactants, such as the PLURAFAC® (alcohols/alkoxylates) and PLURONIC® (ethylene oxide/propylene oxide block copolymers) surfactants manufactured by BASF Corporation, and also cationic or anionic surfactants. Cationic surfactants include quaternary ammonium compounds and amine oxides. Anionic surfactants include but are not limited to alkyl ethoxylate sulfate and alkyl glyceryl sulfonate.

To facilitate the removal of the residual water soluble solvent from inside the styrene polymer particles, the water may be heated. The leeching process for "beads" of precipitated styrene polymer resin can be done in a matter of hours when the water into which the water soluble solvent/styrene polymer solution is heated between 70–100° C. Once the residual water soluble solvent is leeched out of the resin particles, the particles are skimmed off of the surface of the water, and dried.

D. Drying the Styrene Polymer Resin

The reclaimed styrene polymer resin is then dried by several different methods. The particle size of the precipitated resin dictates which method is best suited for drying. When a small concentration of styrene polymer resin is dissolved in the water soluble solvent, and the particle size of the re-precipitated resin is small, the fine powder (large surface area) particles allow for very efficient drying by a hot forced air oven. If the styrene polymer concentration in the water soluble solvent is high, and beads or pellets are formed during the precipitation, an efficient way to remove both trapped residual water soluble solvent and water is to place the particles into a vacuum oven.

For those instances where hot forced air is used as the drying medium, the temperature of the air should be maintained at 80–85° C. When a vacuum oven is used, the temperature should be maintained at 85° C. and as close as possible to a full vacuum should be applied to the system to allow for the most efficient drying cycles. Finally, the reclaimed polystyrene resin can be dried by low or high pressure steam stripping. After drying, the styrene polymer resin is ready for re-use, having gone through the reclamation process without seeing any action heat stress.

E. Solvent Recycling

Finally, the major solvents used in the process are recycled. The water soluble solvent, is totally water miscible, but no azeotropes of water and water soluble solvent form. Also, the boiling points of the two solvents, water and water soluble solvent, are far enough apart (water 100° C. water soluble solvent 202° C.) that the two solvents are easily separated through vacuum distillation. The water boils out of the water soluble solvent. When a vacuum is applied to the system, the water can boil out of the water soluble solvent at temperatures as low as 60° C., at the same tight vacuum, water soluble solvent will not begin to boil until 110° C.–120° C. This results in an easy recovery of both the water soluble solvent and the water. The water would be already heated and could go right back into the styrene polymer resin precipitation bath.

Some non-limiting examples of the present invention, when put into practice, are described hereinbelow:

EXAMPLE 1

437.0 grams of water soluble solvent is added to a 1000 ml Pyrex beaker. A magnetic stirrer is placed into the beaker and the beaker is placed onto a hot plate/magnetic stirrer apparatus. The stirring control is set at a medium speed, and the temperature of the water soluble solvent is increased to 70° C. Once the temperature reaches 70 ° C., 89.0 grams of expanded polystyrene foam packing "peanuts" are added to the water soluble solvent. The polystyrene foam dissolves into the water soluble solvent as fast as it is added.

The liquid level in the beaker after all of the expanded polystyrene is added to the water soluble solvent is at the 550 ml mark. The beginning volume of expanded polystyrene "peanuts" is 16 liters.

On a separate hot plate/magnetic stirrer apparatus, a 3000 ml Pyrex beaker containing 2000 ml of water is agitated at a medium speed and heated up to the temperature of 85° C. Added to the water, prior to heating, is 2.0 grams of PLURAFAC® RA-40 (available from BASF Corporation, Mt. Olive, N.J.) surfactant.

Using an eye dropper, the water soluble solvent-expanded polystyrene foam solution is titrated into 2000 ml of water. Immediately upon contact between the water soluble solvent-expanded polystyrene foam solution and the water, the polystyrene precipitates forming oval shaped beads that initially sink to the bottom of the beaker. The water soluble solvent water trapped inside the beads begin to leech out and the beads float to the surface of the water. The polystyrene beads that are formed are roughly 1/16-1/8 inch in diameter. The beads are left in the agitated hot water for 8 hours time, as the leeching process is occurring.

EXAMPLE 2

Approximately 10.0 grams of the beads that are produced by the process outlined in Example 1, are placed into a hot forced air oven, with the temperature set at 85° C. The beads are left undisturbed in the oven for one and a half hours to dry off any water from the surface and also to allow for final leeching of residual water soluble solvent, away from the polystyrene beads.

The polystyrene that is dried by this process is analyzed by Gas chromatography to determine the water soluble solvent content. The results of the Gas Chromatography test shows that the polystyrene contains 0.77% (by weight) water soluble solvent.

EXAMPLE 3

Approximately 10.0 grams of the beads produced by the process outlined in Example 1 are placed into a vacuum drying oven with the temperature set at 85° C. The vacuum applied to the system is 8.0 mm Hg. The polystyrene is left undisturbed in the oven for 20.0 minutes to dry off water from the surfaces of the beads and also to allow for final leeching of residual water soluble solvent away from the polystyrene beads.

The polystyrene that is dried by this process is analyzed by Gas Chromatography to determine the water soluble solvent content. The results of the Gas Chromatography test shows that the polystyrene contains 0.12% (by weight) water soluble solvent.

Drying with a vacuum oven is more efficient at removing water soluble solvent from the polystyrene beads than the process outlined in Example 2.

EXAMPLE 4

512.0 grams of water soluble solvent are added to a 1000 ml Pyrex beaker. A magnetic stirring bar is placed into the beaker and the beaker is placed onto a hot plate/magnetic stirrer apparatus. The stirring control is set at a medium speed, and the temperature of the water soluble solvent is gradually increased to 65° C. Once the temperature reaches 65° C., 76.5 grams of a solid polymer resin that has been manufactured by the emulsion polymerization of styrene-ethyl acrylate-acrylonitrile (SAA), is added to the water soluble solvent. The SAA polymer dissolves into the water soluble solvent at a quick rate. It takes approximately 1 hour and 20 minutes for all of the solids to totally dissolve.

In another Pyrex beaker having a volume capacity of 3000 ml, is added 2000 ml of water. To the water is added 3.2 grams of PLURAFAC®RA-40 (available from BASF Corporation, Mt. Olive, N.J.) surfactant. A magnetic stirring bar is added to the beaker and the beaker is placed on a hot plate/magnetic stirrer apparatus. The magnetic stirrer control is set at a medium speed, and the temperature of the water is increased to 68° C.

Using an eye dropper, the water soluble solvent/SAA solution is titrated into the 2000 ml of water. Immediately upon contact between the water soluble solvent/SAA resin solution and the water, the SAA resin precipitates forming round beads that initially sinks to the bottom of the agitated water. The water soluble solvent/water trapped inside the beads begin to leech out. The beads float to the surface of the water. The polystyrene beads that are formed are roughly ¼ inch in diameter.

The beads remain in the 68° C. water for approximately 7 hours, after which time they are collected and placed into a forced hot air oven to dry.

EXAMPLE 5

488.0 grams of water soluble solvent are added to a 1000 ml Pyrex beaker. A magnetic stirring bar is added to the beaker, and the beaker is then placed onto a magnetic stirring apparatus. The water soluble solvent is maintained at 24° C., and the agitation speed is turned to a medium setting. 6.1 grams of expanded polystyrene foam packing peanuts are added to the water soluble solvent. The water soluble solvent accepts the polystyrene peanuts and dissolves them as fast as they can be added to the beaker.

Into a separate 3000 ml Pyrex beaker was added 2000 ml of water. A magnetic stirring bar is added to the beaker and the beaker is placed onto a magnetic stirring apparatus with the speed dialed onto a medium setting. The temperature of the water is maintained at 24° C.

Using an eye dropper, the water soluble solvent/expanded polystyrene solution is titrated into the water. Immediately upon contact between the water soluble solvent-expanded polystyrene solution and the water, the precipitation of small particles of polystyrene resin occurs. The polystyrene resin particles looks like a "fluffy" polymeric flocculant and do not sink to the bottom of the water, but instantaneously float on the surface of the water. The particles are allowed to remain suspended on the surface of the water for a period of 4 hours, after which time the polystyrene resin particles are filtered out of the water.

The "paste like" polystyrene filter cake is then spread out onto a 6 inch diameter watch glass and placed into a hot forced air oven with the temperature set at 80° C. for two and one half hours time so the water can be dried from the polystyrene resin. After the drying process, the polystyrene resin is scraped off of the watch glass with a metal laboratory spatula. The polystyrene resin that is collected is in the form of a white powder that has the consistency of calcium carbonate.

EXAMPLE 6

466.0 grams of water soluble solvent are added to a 1000 ml Pyrex beaker. A magnetic stirring bar is added to the beaker, and the beaker is placed onto a magnetic stirring device with the agitation speed control dialed onto a medium setting. The water soluble solvent is maintained at 24° C. Also added to the beaker of water soluble solvent is a small amount of pentane; approximately 2.2 grams. To a separate 3000 ml beaker that also contains a magnetic stirring bar and is set on a magnetic stirring apparatus is added 2000 ml of water. The water is maintained at 24° C. The water is agitated at a medium speed.

After the pentane has been mixed thoroughly throughout the water soluble solvent, resulting in a single phase, clear solution, 38.1 grams of expanded polystyrene foam packing peanuts are added to the water soluble solvent/pentane solution. The polystyrene dissolves into the water soluble solvent almost as fast as it can be added to the beaker.

Using a glass eye dropper, the water soluble solvent/polystyrene/pentane solution is titrated into the water. Immediately upon contact between the water soluble solvent/polystyrene/pentane solution and the water, polystyrene resin beads precipitate out. The beads have dimensions of ⅛ to ¼ inch in diameter.

The beads initially sink to the bottom of the water and hazy residual amounts of water soluble solvent/pentane exudes out of the beads. As the majority of the water soluble solvent leeches out of the beads, they float to the surface of the water. The haziness is the result of the water soluble solvent acting as an emulsifier of the small amounts of pentane that exude out of the polystyrene beads. The beads are allowed to soak in the water for 8 hours, after which time they are collected.

The beads are dried at room temperature (air drying for 2 days.)

After drying, the polystyrene beads are analyzed to determine if any of the pentane remained in the polystyrene after the precipitation process. The gas chromatography test shows that the dried polystyrene contains 3172 ppm of pentane. The calculated maximum concentration of pentane that can be trapped in the polystyrene is 4350 ppm.

What we claim:

1. A process to reclaim styrene containing polymers comprising the steps of:
   a) dissolving a water insoluble styrene containing polymer into a water soluble solvent;
   b) forming a water soluble solvent/styrene containing polymer solution;
   c) precipitating said styrene containing polymer by the addition of said water soluble solvent/styrene containing polymer solution into water;
   d) collecting said precipitated styrene containing polymer;
   e) drying said precipitated styrene polymer for re-use;
   f) recycling of the water and water soluble solvent by heating said water soluble solvent to a point where the water boils away.

2. A process according to claim 1, wherein the water soluble solvent is one of the alkylated pyrrolidones selected from the group consisting of: pyrrolidone, N-methyl pyrrolidone; 1(2-hydroxy ethyl) pyrrolidone iso propyl pyrrolidone; 1-(n-butyl) pyrrolidone; 1-(3-hydroxy propyl) pyrrolidone; 1-(2)-methoxy ethyl)pyrrolidone; 1-(3-methoxy propyl pyrrolidone).

3. The process according to claim 1, wherein the water soluble solvent is from the group N-methyl pyrrolidone; pyrrolidone; N-ethyl pyrrolidone and 1-(2-hydroxy ethyl) pyrrolidone.

4. The process according to claim 2, wherein the water soluble solvent is N-methyl pyrrolidone.

5. The process according to claim 1, wherein the temperature of the water soluble solvent into which the styrene containing polymer is dissolved, is between 24° C. and 100° C.

6. A process according to claim 1, wherein the temperature of the water into which the water soluble solvent/styrene containing polymer solution is added to for the purpose of precipitating said styrene containing polymer between 25° C. and 100° C.

7. A process according to claim 1, wherein a surface active agent, selected from the group consisting of non-ionic, anionic, or cationic is added to the water that is used to precipitate the styrene containing resin for the purpose of regulating the size and shape of the styrene polymer particles that are precipitated.

8. A process according to claim 1, wherein the method for drying the precipitated styrene polymer is hot forced air.

9. A process according to claim 1, wherein the method for drying the precipitated styrene polymer is carried out under vacuum conditions.

10. A process according to claim 1, wherein the method for drying the precipitated styrene polymer is either low pressure or high pressure steam stripping.

\* \* \* \* \*